3,743,654
N-PHENYLMALEIMIDE DERIVATIVES

Akira Fujinami, Ashiya-shi, Toshiaki Ozaki, Toyonaka-shi, Keiichiro Akiba, Takarazuka-shi, Sigeo Yamamoto, Toyonaka-shi, Katsuji Nodera, Nishinomiya-shi, Katsutoshi Tanaka, Takarazuka-shi, and Tadashi Ooishi, Minoo-shi, Japan, assignors to Sumitomo Chemical Company, Ltd., Osaka, Japan
No Drawing. Filed Sept. 11, 1969, Ser. No. 857,217
Claims priority, application Japan, Oct. 9, 1968, 43/73,800
Int. Cl. C07d 27/18
U.S. Cl. 260—326.5 FM  10 Claims

ABSTRACT OF THE DISCLOSURE

Novel N-phenylmaleimide derivatives preferable as microbicides which are represented by the formula

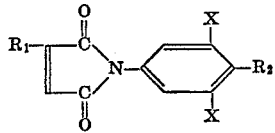

wherein $R_1$ represents a hydrogen atom, a halogen atom, a lower alkyl group or a phenyl group, which may have been substituted by a halogen atom; $R_2$ represents a hydrogen atom, a lower alkyl group or a halogen atom; and X represents a halogen atom, provided that in case $R_1$ and $R_2$ are hydrogen atoms, X represents other halogen atom than a chlorine atom. Examples of such derivatives are:

N-(3',5'-di-bromo or iodo-phenyl) maleimides,
N-(3',4',5'-trihalogenophenyl) maleimides,
N-(3',5'-dihalogeno-4'-alkylphenyl) maleimides,
N-(3',5'-dihalogenophenyl)-3-methylmaleimides,
N-(3',5'-dihalogenophenyl)-3-phenylmaleimides, and
N-(3',5'-dihalogenophenyl)-3-(halogenophenyl) maleimides.

These compounds are prepared by cyclizing corresponding maleic acid monoanilides under dehydration conditions.

BACKGROUND OF THE INVENTION

This invention relates to novel N-phenylmaleimide derivatives valuable as microbicides; to a process for the preparation thereof; and to microbicidal compositions containing said derivatives.

More particularly, the invention pertains to N-phenylmaleimide derivatives represented by the formula

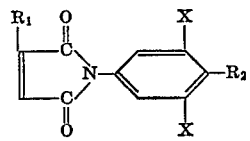

wherein $R_1$ represents a hydrogen atom, a halogen atom, a lower alkyl group or a phenyl group, which may have been substituted by a halogen atom; $R_2$ represents a hydrogen atom, a lower alkyl group or a halogen atom; and X represents a halogen atom, provided that in case $R_1$ and $R_2$ are hydrogen atoms, X represents other halogen atom than a chlorine atom.

Heretofore, not a few N-phenylmaleimide derivatives have been well known. However, the N-phenylmaleimide derivatives in accordance with the present invention are novel compounds and have markedly high microbicidal activities, which can by no means be expected from other known homologues.

OBJECTS OF THE INVENTION

It is therefore the objects of the present invention to provide novel N-phenylmaleimide derivatives, a process for the preparation thereof, and microbicidal compositions containing said derivatives.

CHEMICAL COMPOUNDS

Among the novel compounds represented by the Formula I of the present invention, typical compounds are as enumerated below.

| Compound No. | Chemical structure |
|---|---|
| (1) | N-(3'-5'-dibromophenyl) maleimide |
| (2) | N-(3',4',5'-trichlorophenyl) maleimide |
| (3) | N-(3',5'-dichloro-4'-methylphenyl) maleimide |
| (4) | N-(3',5'-dichlorophenyl)-2-methylmaleimide |
| (5) | N-(3',4',5'-trichlorophenyl)-2-methymaleimide. |
| (6) | N-(3',5'-dichlorophenyl)-2-chloromaleimide |
| (7) | N-(3',5'-diiodophenyl) maleimide |

| Compound No. | Chemical structure |
|---|---|
| (8) | N-(3',5'-dichlorophenyl)-2-phenylmaleimide |
| (9) | N-(3',5'-dibromophenyl)-2-phenylmaleimide |
| (10) | N-(3',5'-dichlorophenyl)-2-(2''-chlorophenyl) maleimide |

UTILITY

The compounds of the present invention have prominent effects on rice blast fungus (*Pyricularia oryzae*), rice sheath blight fungus (*Pellicularia sasakii*), rice Helminthosporium leaf spot fungus (*Cochliobolus miyabeanus*), and scleorotium fungus and powdery mildew fungus of agricultural and horticultural crops, and hence are utilizable as plant disease-controlling agents. Further, they are effective also for the control of *Aspergillus niger*, which propagates in industrial products. Nevertheless, they have little detrimental actions on mammals. For example, the N-(3',5'-dichlorophenyl)-2-methylmaleimide of the present invention scarcely has oral toxicity to mice, and not a mouse was killed even when said compound was administered in a dose of 2,000 mg./kg. Further, the 50% lethal concentration of said compound to gold fish was 10 p.p.m. or more. Microbicides having such broad antimicrobial spectra and strong microbicidal actions have never been proposed heretofore. Accordingly, the utility of the present compounds in the industrial fields is tremendous.

As the result of studies for years, the present inventors have found such characteristic physiological activities of the present compounds are greatly dependent on the kinds and positions of substituents on the benzene rings, which are skeletons of the N-phenylmaleimides. That is, it has been found that halogen atoms should have simultaneously been substituted in the 3- and 5-positions of the benzene ring; that in case the number of substituents is 3, the third substituent should be in the 4-position; that the number of substituents should be 2 or 3; and that in case no such conditions as mentioned above are not satisfied, the compounds are markedly lowered in activity and are entirely deprived of practicality as microbicides. The present invention has been accomplished on the basis of such new findings as mentioned above, and the N-phenylmaleimide derivatives represented by the Formula I satisfy all the above-mentioned conditions.

PROCESS

The novel compounds represented by the Formula I of the present invention are prepared by dehydrating and cyclizing, according to the present invention, N-phenyl-maleic acid monoamide derivatives represented by the Formula II or III.

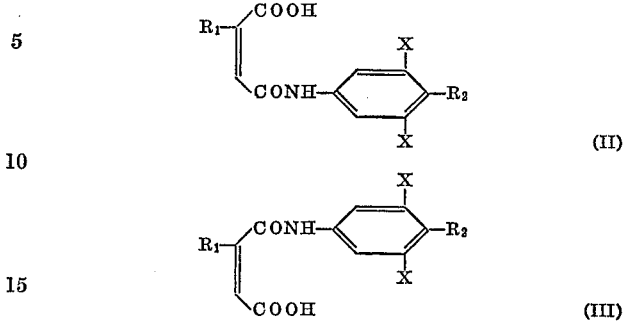

wherein $R_1$, $R_2$ and X are as defined previously.

The N-phenylmaleic acid monoamide derivatives of the Formulas II and III, which are starting materials employed in the present process, can be easily obtained according to ordinary procedures from corresponding maleic anhydrides and anilines. Typical maleic anhydrides and anilines are as set forth below, but it is needless to say that the scope of the present invention is not limited thereby.

Maleic anhydrides:

Maleic anhydride
2-chloromaleic anhydride
2-bromomaleic anhydride
2-methylmaleic anhydride
2-ethylmaleic anhydride
2-propylmaleic anhydride
2-phenylmaleic anhydride
2-(2'-chlorophenyl) maleic anhydride
2-(3'-chlorophenyl) maleic anhydride
2-(4'-chlorophenyl) maleic anhydride Anilines:

3,5-dichloroaniline
3,5-difluoroaniline
3,4,5-trichloroaniline
3,5-dibromoaniline
3,4,5-tribromoaniline
3,5-dichloro-4-methylaniline
3,5-dichloro-4-bromoaniline
3,5-dibromo-4-chloroaniline
3,5-dibromo-4-methylaniline
3,5-dichloro-4-propylaniline
3,5-diiodoaniline In practicing the present process, the starting monoamides are merely heated and melted at about 170° C., whereby the desired products can be obtained. Desirably, however, the starting monoamides are refluxed with stirring in the presence of a suitable dehydrating agent, e.g. acetic anhydride, acetyl chloride, phosphorus pentachloride or phosphorus oxychloride, preferably acetic anhydride, whereby the desired products can be obtained easily and in high yields. In this case, the reaction time is adequately about 1 hour.

MICROBICIDAL COMPOSITIONS:

In actual application as microbicides, the thus obtained compounds of the present invention may be used in pure form without incorporation of other ingredients. For easier application as microbicides, however, they may be used in admixture with inert carriers and can be formulated into any of the ordinarily adopted forms such as, for example, dusts, wettable powders, oil sprays, sprays, tablets, emulsifiable concentrates, granules, etc. Further, the present compounds may be used in admixture with other chemicals such as, for example:

Blasticidin-S,
Kasugamycin,

Polyoxin,
Pentachlorobenzaldoxime,
γ-1,2,3,4,5,6-hexachlorocyclohexane,
N-(3,5-dichlorophenyl) maleic acid imide,
N-(3,5-dichlorophenyl) succinic acid imide,
N-(3,5-dichlorophenyl) itaconic acid imide,
O,O-diethyl-S-benzyl phosphorothioate,
O-ethyl-S,S-diphenyl phosphorodithiolate,
O-butyl-S-benzyl-S-ethyl phosphorodithiolate,
O,O-dimethyl-O-(3-methyl-4-nitrophenyl)phosphorothioate,
S-[1,2-bis(ethoxycarbonyl)ethyl]-O,O-dimethyl phosphorodithioate,
O,O-dimethyl-S-(N-methyl carbamoylmethyl)phosphorodithioate,
O,O-diethyl-O-(2-isopropyl-6-methyl-4-pyramidinyl) thiophosphate, 3,4-dimethylphenyl-N-methylcarbamate,
Zinc ethylenebis dithiocarbamate,
N-trichloromethylthio-4-cyclohexene-1,2-dicarboxyimide,
N-(1,1,2,2-tetrachloroethylthio)-4-cyclohexene-1,2-dicarboxyimide,
iron methylarsonate, etc.

In all cases, the controlling effects of individual chemicals are not deteriorated. Accordingly, the simultaneous control of more than 2 kinds of diseases and injurious insects is possible, and synergistic effects due to mixing can also be expected. In addition, the present compounds may be used in admixture with such agricultural chemicals as herbicides, nematocides and miticides and with fertilizers.

The present invention will be illustrated in further detail below with reference to examples, but it is needless to say that the examples do not limit the scope of the invention.

PREPARATION PROCESS

Examples 1–10

All these examples were carried out according to the following standard operational process:

A mixture comprising 0.1 mole of an N-phenylmaleic acid monoamide represented by the Formula II or III, 50 g. of acetic anhydride and 1 g. of anhydrous sodium acetate is fed to a 100 ml. 4-necked flask and is heated with stirring at 100° C. for 1 hour. Thereafter, acetic acid and acetic anhydride are removed by distillation under reduced pressure, and the residue is water-washed and dried to obtain in high yield a desired N-phenylmaleimide represented by the Formula I. If necessary, the product is recrystallized from ethanol to be brought into a pure form.

Results obtained by practicing the above-mentioned standard operational process are shown in Table 1.

TABLE 1

Resulting N-phenylmaleimides

| Example | Compound No. | Starting N-phenylmaleic acid monoamides | Structure | Yield (percent) | M.P. (°C.) | Calculated C | H | N | Br | Cl | I | Found C | H | N | Br | Cl | I |
|---|---|---|---|---|---|---|---|---|---|---|---|---|---|---|---|---|---|
| 1 | (1) | N-(3′,5′ dibromophenyl) maleic acid monoamide | | 87 | 160.5–162.5 | 36.29 | 1.52 | 4.23 | 48.29 | | | 35.97 | 1.64 | 4.01 | 48.43 | | |
| 2 | (2) | N-(3′,4′,5′ trichlorophenyl) maleic acid monoamide | | 92 | 173–174.5 | 43.44 | 1.46 | 5.07 | | 38.47 | | 43.21 | 1.26 | 5.11 | | 38.22 | |
| 3 | (3) | N-(3′,5′ dichloro 4′ methylphenyl) maleic acid monoamide | | 90 | 151–152 | 51.59 | 2.76 | 5.47 | | 27.69 | | 51.63 | 2.46 | 5.27 | | 27.90 | |

TABLE 1—Continued

| Example | Compound No. | Starting N-phenylmaleic acid monoamides | Resulting N-phenylmaleimides Structure | Yield (percent) | M.P. (°C.) | Elementary analysis (percent) Calculated C | H | N | Br | Cl | I | Found C | H | N | Br | Cl | I |
|---|---|---|---|---|---|---|---|---|---|---|---|---|---|---|---|---|---|
| 4 | (4) | N-(3',5'-dichlorophenyl) 2(or 3) methylmaleic acid monoamide. | (structure) | 88 | 116.5–118 | 51.9 | 2.76 | 5.47 | | 27.69 | | 51.63 | 2.63 | 5.35 | | 27.74 | |
| 5 | (5) | N-(3',4',5' trichlorophenyl)-2(or 3)-methylmaleic acid monoamide. | (structure) | 93 | 137–138 | 45.47 | 2.08 | 4.82 | | 36.61 | | 45.27 | 2.03 | 4.98 | | 36.82 | |
| 6 | (6) | N-(3',5'-dichlorophenyl)-2(or 3)-chloromaleic acid monoamide. | (structure) | 85 | 115.5–116.5 | 43.44 | 1.46 | 5.07 | | 38.47 | | 43.78 | 1.38 | 4.99 | | 38.84 | |
| 7 | (7) | N-(3',5'-diiodophenyl) maleic acid monoamide. | (structure) | 86 | 170–172 | 31.86 | 1.34 | 3.72 | | | 67.33 | 31.74 | 1.56 | 3.93 | | | 67.18 |
| 8 | (8) | N-(3',5'-dichlorophenyl)-2 (or 3)-phenylmaleic acid monoamide. | (structure) | 90 | 163–164.5 | 60.46 | 2.85 | 4.40 | | 22.29 | | 60.35 | 2.66 | 4.50 | | 22.48 | |
| 9 | (9) | N-(3',5'-dibromophenyl)-2 or (3)-phenylmaleic acid monoamide. | (structure) | 86 | 166.5–168.5 | 47.21 | 2.23 | 3.44 | 39.26 | | | 47.55 | 2.22 | 3.27 | 38.89 | | |
| 10 | (10) | N-(3',5'-dichlorophenyl)-2 (or 3)-(2''-chlorophenyl) maleic acid monoamide. | (structure) | 91 | 196.5–197 | 54.50 | 2.29 | 3.97 | | 30.17 | | 54.55 | 2.13 | 4.02 | | 29.95 | |

PREPARATION OF MICROBICIDAL COMPOSITIONS

The active compound employed is represented by the number of each compound exemplified previously.

Example 11.—Dust 3 parts of the compound (3) and 97 parts of clay were thoroughly pulverized and mixed together to obtain a dust containing 3% of active ingredient. In application, the dust was dusted as it was.

Example 12.—Dust 4 parts of the compound (10) and 96 parts of talc were thoroughly pulverized and mixed together to obtain a dust containing 4% of active ingredient. In application, the dust was dusted as it was.

Example 13.—Wettable powder 50 parts of the compound (7), 5 parts of a wetting agent of alkylbenzenesulfonate type and 45 parts of diatomaceous earth were thoroughly pulverized and mixed together to obtain a wettable powder containing 50% of active ingredient. In application, the wettable powder was diluted with water and was sprayed.

Example 14.—Emulsifiable concentrate 10 parts of the compound (6), 80 parts of dimethyl sulfoxide and 10 parts of an emulsifier of polyoxyethylene phenylphenol ether type were mixed together to obtain an emulsifiable concentrate containing 10% of active ingredient. In application, the emulsifiable concentrate was diluted with water and was sprayed.

Example 15.—Granule 5 parts of the compound (5), 93.5 parts of clay and 1.5 parts of a binder of polyvinyl alcohol type were thoroughly pulverized and mixed together. After kneading with water, the mixture was granulated and dried to obtain a granule preparation containing 5% of active ingredient.

Example 16.—Composite dust 2 parts of the compound (1), 1.5 parts of O-n-butyl-S-ethyl-S-benzyl phosphorodithiolate, 0.1 part of Kasugamycin and 96.4 parts of clay were thoroughly pulverized and mixed together to obtain a dust containing 3.6% of active ingredient. In application, the dust was dusted as it was.

Example 17.—Composite dust 2 parts of the compound (4), 1.5 parts of O-n-butyl-S-ethyl-S-benzyl phosphorodithiolate, 2 parts of O,O-dimethyl-O-(3-methyl-4-nitrophenyl) phosphorothioate, 1.5 parts of 3,4-dimethylphenyl-N-methyl carbamate and 93 parts of clay were thoroughly pulverized and mixed together to obtain a dust containing 7% of active ingredient. In application the dust was dusted as it was.

Effects: In order to substantiate excellent microbicidal effects of the present compounds, typical test results will be shown in the test examples set forth below.

Test Example 1.—Effects of controlling rice blast fungus (*Pyricularia oryzae*)

Rice plants (variety: "Waseasahi"), which had been cultivated to the 3 leaves stage in flower pots of 9 cm. in diameter, were individually sprayed with 7 ml./pot of an aqueous dilute solution of each of test chemicals in the form of wettable powders. After one day, the rice plants were sprayed and inoculated with a spore suspension of rice blast fungus (*Pyricularia oryzae*). 5 days thereafter, the number of disease spots generated was counted to investigate the fungicidal effect of each chemical, whereby the results shown in Table 2 were obtained. As seen in Table 2, the present compounds showed markedly excellent effects as compared with the control known compounds.

TABLE 2

| Compound | Active ingredient concentration (p.p.m.) | Number of spots per 10 leaves |
|---|---|---|
| (3) | 500 | 18 |
| (6) | 500 | 26 |
| 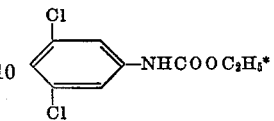 (Known compound) | 500 | 225 |
| Non-treatment | | 377 |

*Control.

Test Example 2.—Effects of controlling rice Helminthosporium leaf spot fungus (*Cochliobolus miyabeanus*)

Rice plants (variety: "Waseasahi"), which had been cultivated to the 4 leaves stage in flower pots of 9 cm. in diameter, were individually dusted by use of a bell jar duster with 100 mg./pot of each of test chemicals in the form of dusts. After one day, the rice plants were sprayed and inoculated with a spore suspension of rice Helminthosporium leaf spot fungus (*Cochliobolus miyabeanus*).

3 days thereafter, the number of disease spots generated was counted to investigate the fungicidal effect of each chemical, whereby the results shown in Table 3 were obtained. As seen in Table 3, the present compounds showed markedly prominent effects as compared with the control known compounds.

TABLE 3

| Compound | Active ingredient concentration (percent) | Number of spots per leaf |
|---|---|---|
| (1) | 3.0 | 0 |
| (2) | 3.0 | 4 |
| (3) | 3.0 | 0 |
| (4) | 3.0 | 6 |
| (5) | 3.0 | 13 |
| (6) | 3.0 | 7 |
| (7) | 3.0 | 6 |
| (9) | 3.0 | 19 |
| (10) | 3.0 | 17 |
| (Known compound)* | 3.0 | 83 |
| (Known compound)* | 3.0 | 67 |
| (Known compound)* | 3.0 | 61 |
| Non-treatment | | 78 |

*Control.

Test Example 3.—Effects of controlling rice sheath blight fungus (*Pellicularia sasakii*)

Rice plants (variety: "Waseasahi") were cultivated four stems in each of flower pots of 9 cm. in diameter. When grown to a height of 50–60 cm., the plants were sprayed with 10 ml./pot of an aqueous dilute emulsion of each of test chemicals in the form of emulsifiable concentrates. After 3 hours, mycelial disc inoculum of rice sheath blight fungus (*Pellicularia sasakii*) were applied to and inoculated in the leaf sheaths of individual stems of the plant. 5 days thereafter, the sizes of disease spots generated on the leaf sheaths were measured to calculate the degrees of damage and to investigate the fungicidal effects of the chemicals. The results were as shown in Table 4. As seen in Table 4, the present compounds showed markedly prominent controlling effects as compared with the control known compounds.

TABLE 4

| Compound | Active ingredient concentration (p.p.m.) | Degree of damage |
|---|---|---|
| (1) | 200 | 0 |
| (2) | 200 | 9.2 |
| (3) | 200 | 11.4 |
| (4) | 200. | 2.3 |
| (8) | 200 | 8.5 |
| Cl–C$_6$H$_3$Cl–NHCOOC$_2$H$_5$* (Known compound) | 200 | 87.4 |
| Cl–C$_6$H$_3$Cl–NHSO$_2$CH$_2$Cl* (Known compound) | 200 | 92.8 |
| TUZ (Trade name)* | 200 | 7.6 |
| Non-treatment | | 100 |

*Control.

NOTE.—(TUZ)=An 80% wettable powder comprising: monomethylarsine-bis-dimethyl dithiocarbamate, 20%; zinc dimethyl dithiocarbamate, 20%; tetramethylthiuram disulfide, 40%.

Test Example 4.—Effects of controlling powdery mildew (*Sphaerotheca fuliginea*) of cucurbitaceous plants Pumpkin plants (variety: "Heian Kogiku") were cultivated in flower pots of 12 cm. in diameter. When grown to the 3–4 leaves stage, the plants were sprayed with 7 ml./pot of each of given concentration solutions of test chemicals in the form of wettable powders. One day after, the plants were sprayed and inoculated with a spore suspension of cucurbitaceous plant mildew fungus (*Sphaerotheca fuliginea*). 10 days thereafter, the state of disease of 4 leaves at the upper portion of each plant was observed, and the degree of damage was calculated from the area of spots generated. In each treatment, 7 pots were tested to obtain the results shown in Table 5. As seen in Table 5, the present compounds displayed markedly excellent effects as compared with the control known compounds.

TABLE 5

| Compound | Active ingredient concentration (p.p.m.) | Degree of damage |
|---|---|---|
| (4) | 500 | 4.8 |
| (6) | 500 | 6.7 |
| Cl–C$_6$H$_3$Cl–NHCOOC$_2$H$_5$* (Known compound) | 500 | 31.2 |
| Cl–C$_6$H$_4$–N(COCOCH$_3$)(COCH)* (Known compound) | 500 | 46.1 |
| Non-treatment | | 50.9 |

*Control.

Test Example 5.—Effects of controlling damping-off fungus (*Pellicularia filamentosa*) of cucumber plants Flower pots of 9 cm. in diameter were individually packed with a farm soil. Further, 10 ml./pot of a contaminated soil, in which had been cultured and propagated cucumber seedling damping-off fungus (*Pellicularia filamentosa*), was uniformly spread on the surface of said farm soil. Subsequently, the soil was irrigated with 15 ml./pot of a 500 p.p.m. aqueous emulsion of each of test chemicals in the form of emulsifiable concentrates. After 2 hours, 10 seeds per pot of cucumber (variety: "Kairyo Aodaicho") were sowed in the soil. 5 days thereafter, the state of disease of cucumber seedlings was observed to calculate the ratio of non-damaged seedlings and to investigate the fungicidal effects of the chemicals. The results were as set forth in Table 6. As seen in Table 6, the present compounds showed markedly excellent effects.

TABLE 6

| Compound | Active ingredient concentration (p.p.m.) | Stand percent (ratio of non-damaged seedlings) |
|---|---|---|
| (1) | 500 | 88 |
| (4) | 500 | 93 |
| (7) | 500 | 90 |
| Cl–C$_6$H$_3$Cl–NHCOOC$_2$H$_5$* (Known compound) | 500 | 0 |
| Pentachloronitrobenzene* (commercially available microbicide) | 500 | 86 |
| Non-treatment, inoculated with fungus | | 0 |
| Non-treatment, no fungus inoculated | | 100 |

*Control.

Test Example 6.—Antimicrobial spectra

According to the agar medium dilution method, the growth-inhibiting effects of the compound (4) on various plant pathogenic fungi and bacteria were investigated to obtain the results as set forth in Table 7.

TABLE 7

| Test organisms: | Effective concentration (p.p.m.) |
|---|---|
| Pyricularia oryzae | 40 |
| Xanthomonas oryzae | 200 |
| Pellicularia filamentosa | 40 |
| Fusarium oxysporum f. niveum | 200 |
| Corticium rolfsii | 200 |
| Botrytis cinerea | 8 |
| Sclerotinia sclerotiorum | 8 |
| Alternaria kikuchiana | 8 |
| Alternaria mali | 200 |
| Glomerella cingualata | 40 |

According to the same method as mentioned above, the growth-inhibiting effects of compounds on (*Aspergillus niger* ATCC 9642 strain) were investigated to obtain the results as set forth in Table 8.

TABLE 8

| Compound | Effective concentration (p.p.m.) |
|---|---|
| (1) | 200 |
| (2) | 200 |
| (3) | 200 |
| (5) | 200 |
| 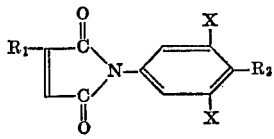 (Control) | 1,000< |

NOTE.—"1,000<" shows that no effect was observed at a concentration of 1,000 p.p.m.

What is claimed is:

1. An N-phenylmaleimide derivative represented by the formula:

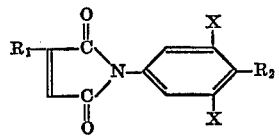

wherein $R_1$ represents a halogen atom, a lower $C_1$-$C_3$ alkyl group, a phenyl group or a halogen-substituted phenyl group; $R_2$ represents a hydrogen atom, a lower $C_1$-$C_3$ alkyl group or a halogen atom; and X represents a halogen atom.

2. An N-phenylmaleimide derivative according to claim 1, wherein $R_1$ is a lower $C_1$-$C_3$ alkyl group, $R_2$ is a hydrogen atom and X is a halogen atom.

3. An N-phenylmaleimide derivative according to claim 1 wherein $R_2$ represents a lower $C_1$-$C_3$ alkyl group or a halogen atom.

4. An N - phenylmaleimide derivative represented by the formula

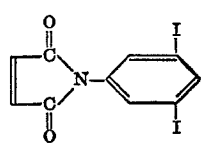

wherein $R_1$ represents a phenyl group or a halogen-substituted phenyl group; $R_2$ represents a hydrogen atom, a $C_1$ to $C_3$ alkyl group or a halogen atom; and X represents a halogen atom.

5. An N - phenylmaleimide derivative represented by the formula

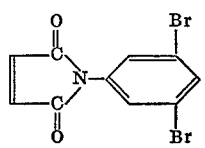

6. An N - phenylmaleimide derivative represented by the formula

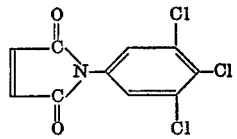

7. An N - phenylmaleimide derivative represented by the formula

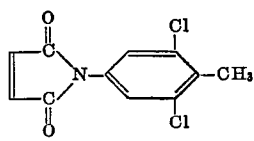

8. An N - phenylmaleimide derivative represented by the formula

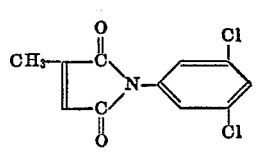

9. An N - phenylmaleimide derivatives represented by the formula

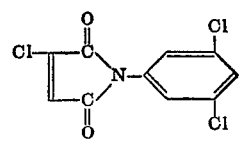

10. An N - phenylmaleimide derivative represented by the formula

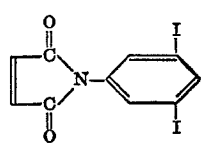

References Cited

UNITED STATES PATENTS

| 3,394,145 | 7/1968 | Bublitz | 260—326.5 |
| 2,788,349 | 4/1957 | Snyder | 260—326.3 |
| 2,262,262 | 11/1941 | Speer | 260—326.5 |
| 3,586,697 | 6/1971 | Ozaki et al. | 260—326.5 |

OTHER REFERENCES

Keitt, Chem. Abs. 55: 7566e (1961).
Kretov et al., Chem. Abs. 50: 13772a (1957).

JOSEPH A. NARCAVAGE, Primary Examiner

U.S. Cl. X.R.

424—274

UNITED STATES PATENT OFFICE
CERTIFICATE OF CORRECTION

Patent No. 3,743,654    Dated July 3, 1973

Inventor(s) AKIRA FUJINAMI, ET. AL.

It is certified that error appears in the above-identified patent and that said Letters Patent are hereby corrected as shown below:

On the cover sheet insert -- The portion of the term of this patent subsequent to June 22, 1988, has been disclaimed. -- .

Signed and sealed this 21st day of January 1975.

(SEAL)
Attest:

McCOY M. GIBSON JR.
Attesting Officer

C. MARSHALL DANN
Commissioner of Patents